L. WILLIAMS.
ELECTRICALLY OPERATED INK RECORDER.
APPLICATION FILED APR. 15, 1919.
1,306,985.
Patented June 17, 1919.
2 SHEETS—SHEET 2.
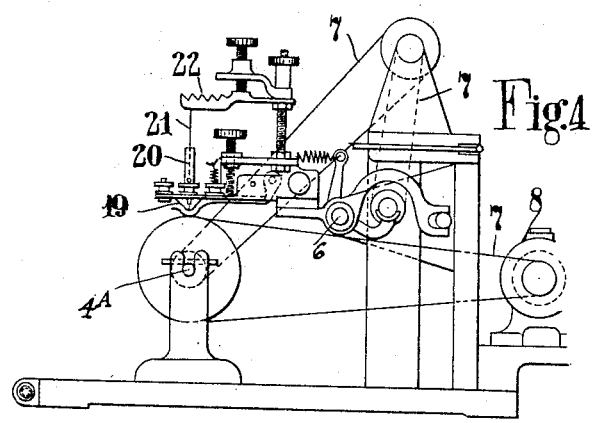
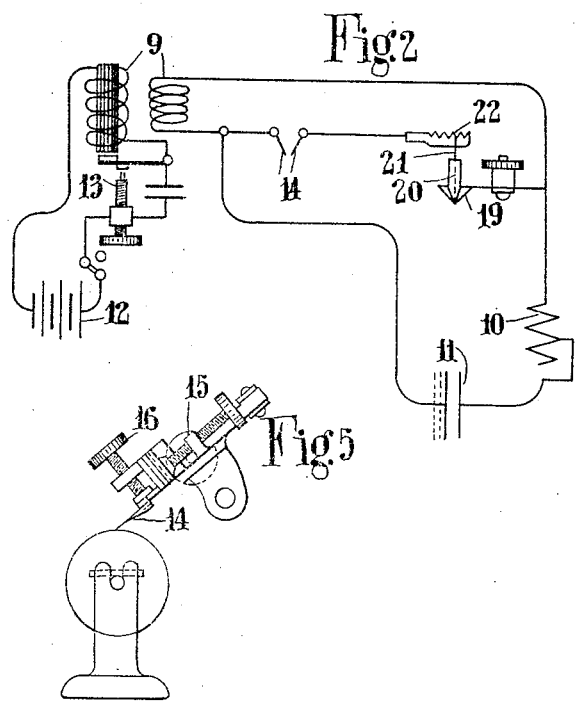
INVENTOR
L. Williams
BY H. R. Kerslake
ATTORNEY

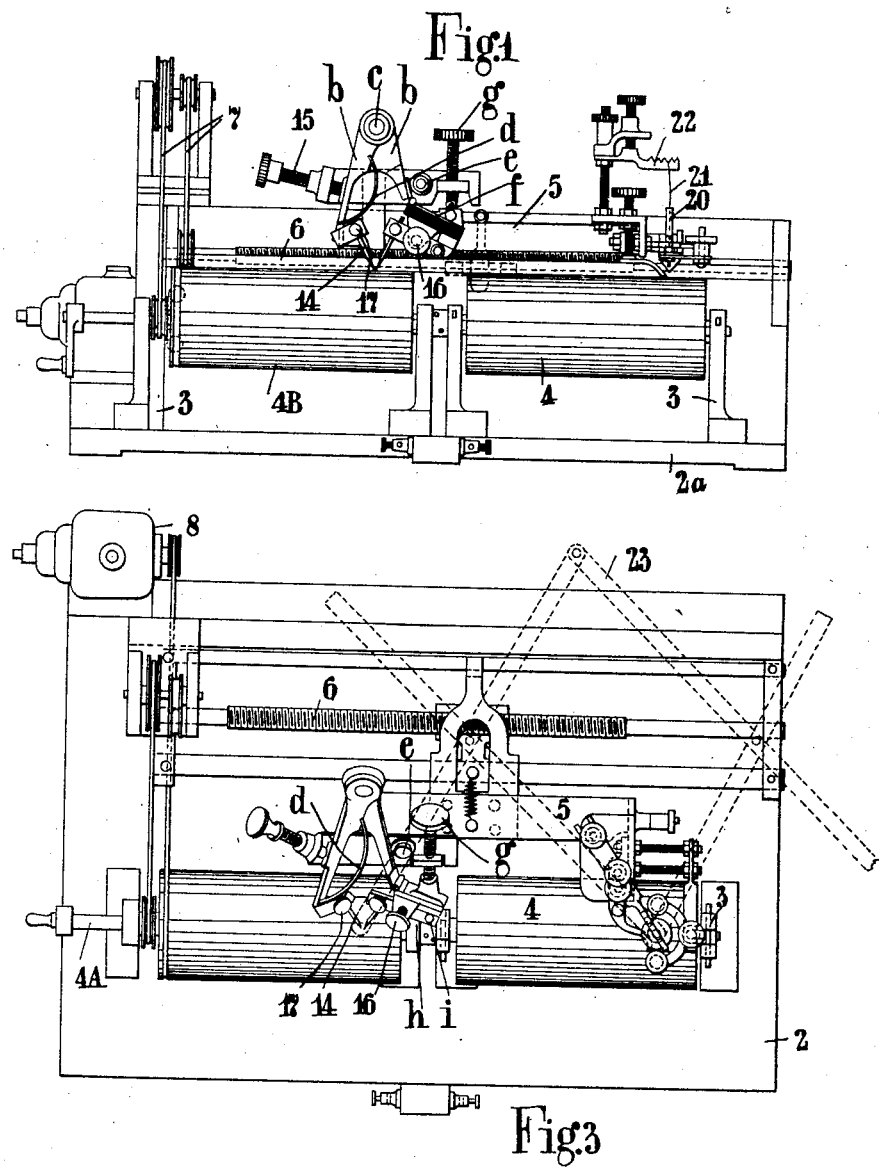

UNITED STATES PATENT OFFICE.

LLOYD WILLIAMS, OF CADISHEAD, NEAR MANCHESTER, ENGLAND.

ELECTRICALLY-OPERATED INK-RECORDER.

1,306,985.  Specification of Letters Patent.  Patented June 17, 1919.

Application filed April 15, 1919. Serial No. 290,339.

*To all whom it may concern:*

Be it known that I, LLOYD WILLIAMS, a subject of the King of Great Britain and Ireland, and resident of 7 Moss Side road, Cadishead, near Manchester, England, have invented certain new and useful Improvements in Electrically-Operated Ink-Recorders, of which the following is a specification.

This invention relates to the electrical operation of recording and like instruments and more particularly to instruments which, upon the closing of an electric circuit or upon the passage of an electric current in a circuit containing the recording instrument, produce a line or dot record of the periods during which the circuit was closed or the current passed.

My invention may be applied for giving a record of the number and extent of the oscillations in an electric discharge from a source of high potential, or for giving a record of the number and character of electric waves such as are produced in wireless telegraphy and for receiving and recording the number and character of electric oscillations used in ordinary telegraphy. In conjunction with an instrument hereinafter termed a copying instrument, my improved recording instrument can be utilized for reproducing drawings, photographs and the like, where the drawing or the like to be copied consists of lines or markings made with an electrical conducting material which closes the circuit which contains the recording instrument.

My invention comprises a recording instrument consisting of a liquid well or holder having a very fine outlet duct, and an electrical terminal supported in the liquid in said holder and adjacent the said duct, the holder and terminal being in an electrical circuit so that when current passes momentarily through the said circuit there is produced a pulsation in the liquid holder which results in the expulsion of sufficient of the liquid on to paper or the like to give an indication of the strength and duration of the electrical pulsation.

My invention further comprises the combination with a recording or reproducing instrument as aforesaid and in the electrical circuit containing the liquid holder and terminal of the recording instrument, of a tracing or copying device (hereinafter termed a copying device) consisting of at least two pointer-like elements in the electric circuit, electrical continuity between said elements being produced by the black lead or like conductor or partial conductor of electricity in which the drawing is made, the said pointers being traversed over the face of the drawings so as to come into contact with all the lines or markings thereon so that the recording instrument produces marks similar to the marks over which the copying device has traveled.

My invention further comprises the details of construction hereinafter described.

Referring to the accompanying explanatory drawings which illustrate a combined copying and recording or reproducing instrument or machine constructed in one convenient form in accordance with my invention:—

Figure 1 is a front elevation, Fig. 2 a diagram of the electrical connections, Fig. 3 a plan view and Fig. 4 an end view. Fig. 5 is an end view of the copying instrument.

The same reference letters in the different views indicate the same parts.

In one convenient application of my invention, the drawing or the like to be copied is mounted upon the drum $4^B$ and the paper on which the reproduction is to be made is placed on the drum 4, the two drums being carried by a common spindle $4^A$ in brackets 3 on the base $2^a$ and being rotated by a cord or the like from the motor 8. The screwed shaft 6 is rotated from the drum shaft $4^A$ by the ropes or cords 7 shown in Fig. 4. The said screwed shaft traverses a part 5 carrying the copying and reproducing instruments.

The copying instrument consists of two arms $b$, $b$ pivoted to one another at $c$ with a blade spring $d$ tending to press the arms apart. The screwed stud 15 serves to adjust the position of the one arm while the other arm rests against a stop $e$. The pointers 14 are carried one directly upon the arm $b$, and the other upon a part $f$ hinged to the other arm $b$ and adjusted in position by the screwed stud $g$. The pointers are held in place by the screwed studs 17. The stud 16 serves as an additional adjusting means for the arm h pivoted at i carrying the right hand pointer 14 (Fig. 3).

The recording or reproducing instrument comprises a liquid well or holder 19 having a small outlet duct in its apex and containing an electrical terminal 21 insulated by a cover 20 except at its lower end or point. The terminal 21 is carried by a spring arm 22 which can be adjusted in position by means of the screwed studs and like means illustrated in Figs. 1 and 3. The outlet duct may be made in a jewel and be of about one-thousandth of an inch diameter.

In operation, the copying pointers or needles 14 are set with their points very close together so that electrical connection between them can be established by the blacklead or other lines or markings on the drawing or the like being copied. When such electric connection is made, an electric pulsation results in the liquid well 19 due to the passage of current between the terminal 21 and the well, and a drop of the liquid is expelled through the outlet duct in the apex of the well. (The said pulsation is due to the disintegrating effect of the current on the metallic terminal causing the ink to be ejected through the outlet duct together with the fine particles of the substance of the terminal). As the copying and recording instruments move in unison, the latter instrument will reproduce the drawing over which the copying instrument works.

The method of mounting the wire 21 insures that during the working of the apparatus, it is gently agitated or vibrated and so prevents particles of carbon bridging between the needle and the fluid holder 19.

By the use of a pantograph shown in dotted lines at 23, Fig. 3, for connecting together the copying and reproducing instruments, and by suitably varying the drum diameters, enlargements and reductions in the drawings copied can be made.

The electrical arrangements illustrated in Fig. 2 comprise a battery 12, a transformer 9 with contact breaker 13, an adjustable inductance 10 and adjustable condenser 11. A source of high frequency alternating current may be employed in place of a battery and transformer.

It will of course be understood that the copying and reproducing instruments may be at any distance apart provided that the moving parts of the two apparatus move in unison and any number of reproducing instruments may be operated from one copying instrument.

The current for operating the reproducing device is a high tension high frequency current and may be obtained from a transformer or from a magneto or from any suitable source of electricity. Adjustable condensers and inductances may be placed across the copying and reproducing devices so as to adjust the sensitiveness of the copying device in order to insure that should the drawing being copied be smudged by the lead pencil or like conductor of electricity, the reproducing instrument will only reproduce the distinct and well defined lines or marks on the drawing.

The recording or reproducing instrument will give a line record or indication of the electrical discharge of, as for example, a Leyden jar, or of electrical waves or like electrical oscillations.

I may vary the arrangement and details of the copying and recording instruments to meet any particular services or requirements.

Having now described my invention what I claim as new and desire to secure by Letters Patent is:—

1. An electrically operated recording and reproducing instrument consisting of a liquid well or holder having a very fine outlet duct, and an electrical terminal supported in the liquid in said holder and adjacent the said duct, the holder and terminal being in an electrical circuit, so that if current passes momentarily through the said circuit there is produced a pulsation in the liquid holder which results in the expulsion of liquid therefrom, as set forth.

2. An electrically operated recording and reproducing instrument, comprising, in combination, a liquid well or holder having a very fine outlet duct, an electrical terminal supported in the liquid in said holder and adjacent the said duct, an electric circuit containing said holder and terminal, means causing current to pass momentarily through the said circuit, a receiving surface for the record, and means traversing the liquid well or holder over said receiving surface, as set forth.

3. An electrically operated recording and reproducing instrument, comprising, in combination, a liquid well or holder having a very fine outlet duct, an electrical terminal, a vibratory support holding the said terminal in the liquid in the well or holder, an insulator around the terminal except at its point, an electric circuit containing the said well and holder and terminal, means causing current to pass momentarily through the said circuit, a receiving surface for the record, a drum carrying said receiving surface, means for rotating the drum and means traversing the liquid well or holder back and forth across the drum, as set forth.

4. An electrically operated recording and reproducing instrument comprising, in combination, a liquid well or holder having a very fine outlet duct, an electrical terminal supported in the liquid in said well or holder, an electrical circuit containing the said well or holder and terminal, a drawing made in electric conducting material, two adjustable terminals in said circuit moving over said drawing, a receiving surface for the record, means for moving the drawing and receiving surface, and common supporting means traversing the adjustable terminals and the liquid well or holder back and forth across the drawing and the receiving surface respectively, as set forth.

In testimony whereof I have signed my name to this specification.

LLOYD WILLIAMS.